United States Patent [19]

Dye

[11] Patent Number: 4,965,559

[45] Date of Patent: Oct. 23, 1990

[54] MULTI-CHANNEL GRAPHICS CONTROLLER

[75] Inventor: Thomas A. Dye, Cedar Park, Tex.

[73] Assignee: Motorola, Inc., Schaumburg, Ill.

[21] Appl. No.: 199,505

[22] Filed: May 31, 1988

[51] Int. Cl.$^5$ .............................................. G09G 3/02
[52] U.S. Cl. ................................ 340/717; 340/706; 340/720
[58] Field of Search ............... 340/717, 710, 706, 720; 364/521

[56] References Cited

U.S. PATENT DOCUMENTS

| | | | |
|---|---|---|---|
| 3,648,249 | 3/1972 | Goldsberry | 340/717 |
| 4,677,570 | 6/1987 | Taki | 340/717 |
| 4,684,935 | 8/1987 | Fujisaku et al. | 340/717 |
| 4,688,170 | 8/1987 | Waite et al. | 340/717 |
| 4,695,966 | 9/1987 | Takakura et al. | 340/717 |
| 4,704,697 | 11/1987 | Kiremidjian et al. | 340/717 |
| 4,760,388 | 7/1988 | Tatsumi et al. | 340/717 |
| 4,825,201 | 4/1989 | Watanabe et al. | 340/717 |
| 4,960,387 | 7/1988 | Ishii et al. | 340/717 |

FOREIGN PATENT DOCUMENTS

| | | | |
|---|---|---|---|
| 0120428 | 6/1985 | Japan | 340/717 |
| 0218132 | 10/1985 | Japan | 340/717 |

*Primary Examiner*—Alvin E. Oberley
*Assistant Examiner*—M. Fatahi-yar
*Attorney, Agent, or Firm*—Raymond J. Warren

[57] ABSTRACT

A multi-channel video graphics display system is provided which utilizes a single graphics controller and associated graphics processor to supply independent video graphic information to a plurality of independent display terminals.

10 Claims, 4 Drawing Sheets

MULTI-CHANNEL GRAPHICS CONTROLLER

BACKGROUND OF THE INVENTION

This invention relates, in general, to video graphics display systems and, more particularly, to a video graphics display system capable of providing independent display information to a plurality of display terminals utilizing a single graphics controller.

There are currently available many different video graphics display systems some of which are capable of providing independent video graphic information to multiple displays. However, in each of these systems a separate graphics controller is used to provide the graphics information to each individual display unit. This results in a relatively high fixed cost per display unit for each video graphics terminal, and the cost of the video graphics controllers in such systems is directly proportional to the number of terminals associated therewith.

SUMMARY OF THE INVENTION

It is therefore an object of the present invention to provide a multi-channel graphics display system which is capable of driving multiple independent displays with a single graphics controller.

Another object of the present invention is to provide a multi-channel graphics display system wherein the number of terminals to be driven and the resolution displayed on each terminal is easily selectable.

It is still further an object of the present invention to provide a multi-channel graphics display system wherein the graphics controller portion of the system is physically separate from that portion which determines the number of terminals to be driven, such that only a minor portion of the graphics display system circuitry need be redesigned to modify the system for any given combination of number of terminals, display resolution, or other specific system parameters.

The above and other features and objects are provided in the present invention wherein there is provided an interface system for receiving and interpreting signals from a VME bus representing video graphics information to be displayed on a plurality of displays. A local controller is coupled to the VME interface system and to a single graphics controller. The single graphics controller is coupled to a video interface system which is also coupled to a plurality of video displays for providing independent video graphic display information on each of said video displays.

BRIEF DESCRIPTION OF THE DRAWINGS

The above mentioned and other features of the invention and the manner of attaining them will become more apparent and the invention itself would be best understood by reference to the following description of an embodiment of the invention taken in conjunction with the accompanying drawings, wherein.

DETAILED DESCRIPTION OF THE DRAWINGS

Figure 1:
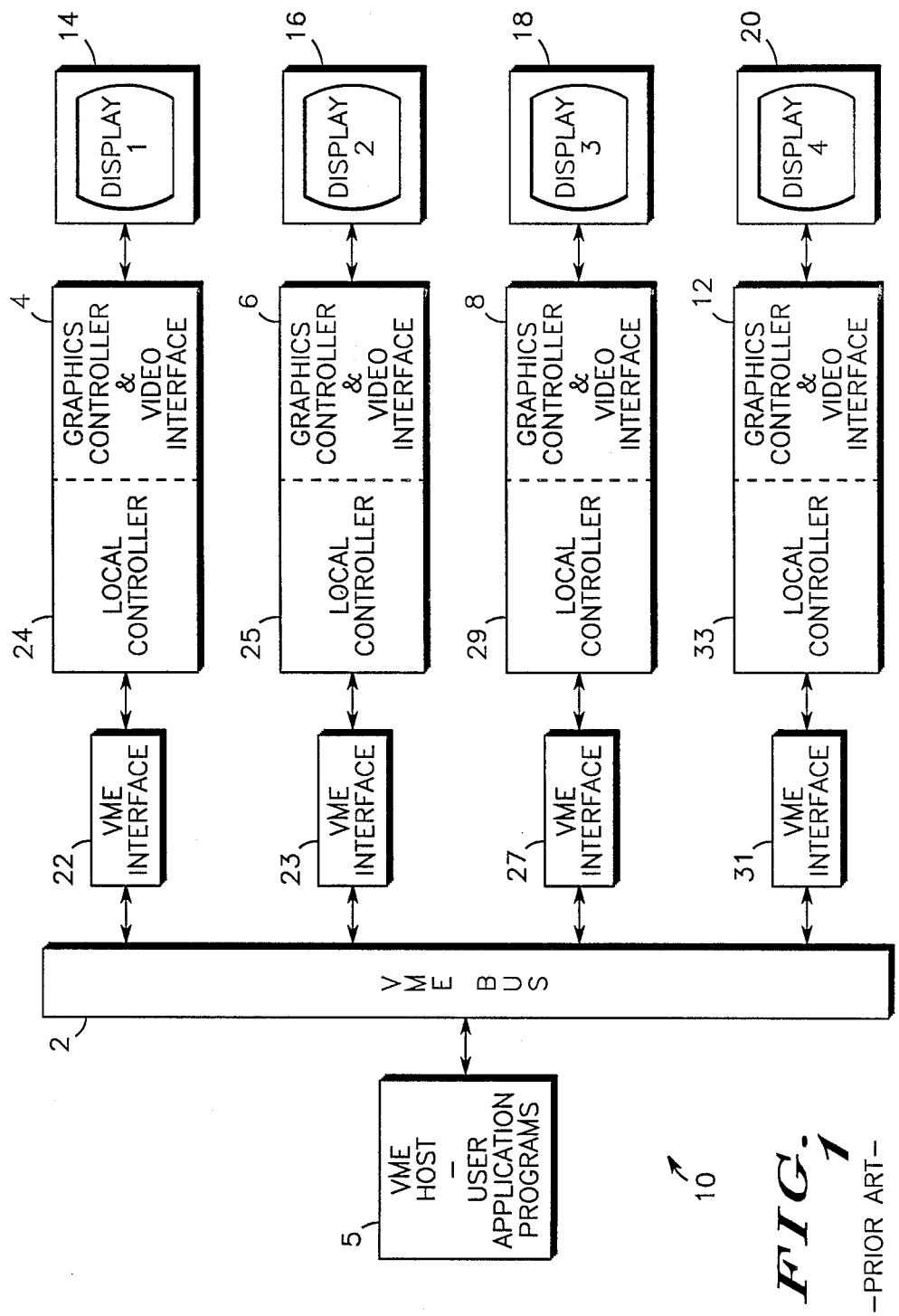
FIG. 1 is a general block diagram of a typical prior art graphics controller system.

FIG. 1 illustrates in block diagram form a typical prior art graphics controller system wherein a system bus such as VME bus 2 is coupled to VME interface circuits 22, 23, 27 and 31 which are in turn coupled to local controllers 24, 25, 29 and 33. Local controllers 24, 25, 29 and 33 are each respectively coupled to the separate graphics and video interface systems 4, 6, 8 and 12, which are in turn coupled to their respective display terminals 14, 16, 18 and 20.

In operation the VME interface portion of the system is used to receive and transmit signals on the VME bus in accordance with the VME bus system definition as is well known to those skilled in the art. For a given display, the local controller portion of the system, in conjunction with the VME interface portion, would then generate separate graphics information to be displayed on the display terminal in accordance with the information received from the VME bus. The video graphics information intended for display on terminal 14, for example, would then be transmitted to graphics controller and video interface circuitry 4 of the system. This graphics controller and video interface portion of the system would be used to directly drive display terminal 14. As indicated in FIG. 1 a separate dedicated graphics controller and video interface circuit is required for each display terminal. In some systems there may be only a single VME interface or local controller, but there is still a requirement for a separate graphics controller and video interface for each display terminal.

Figure 2:
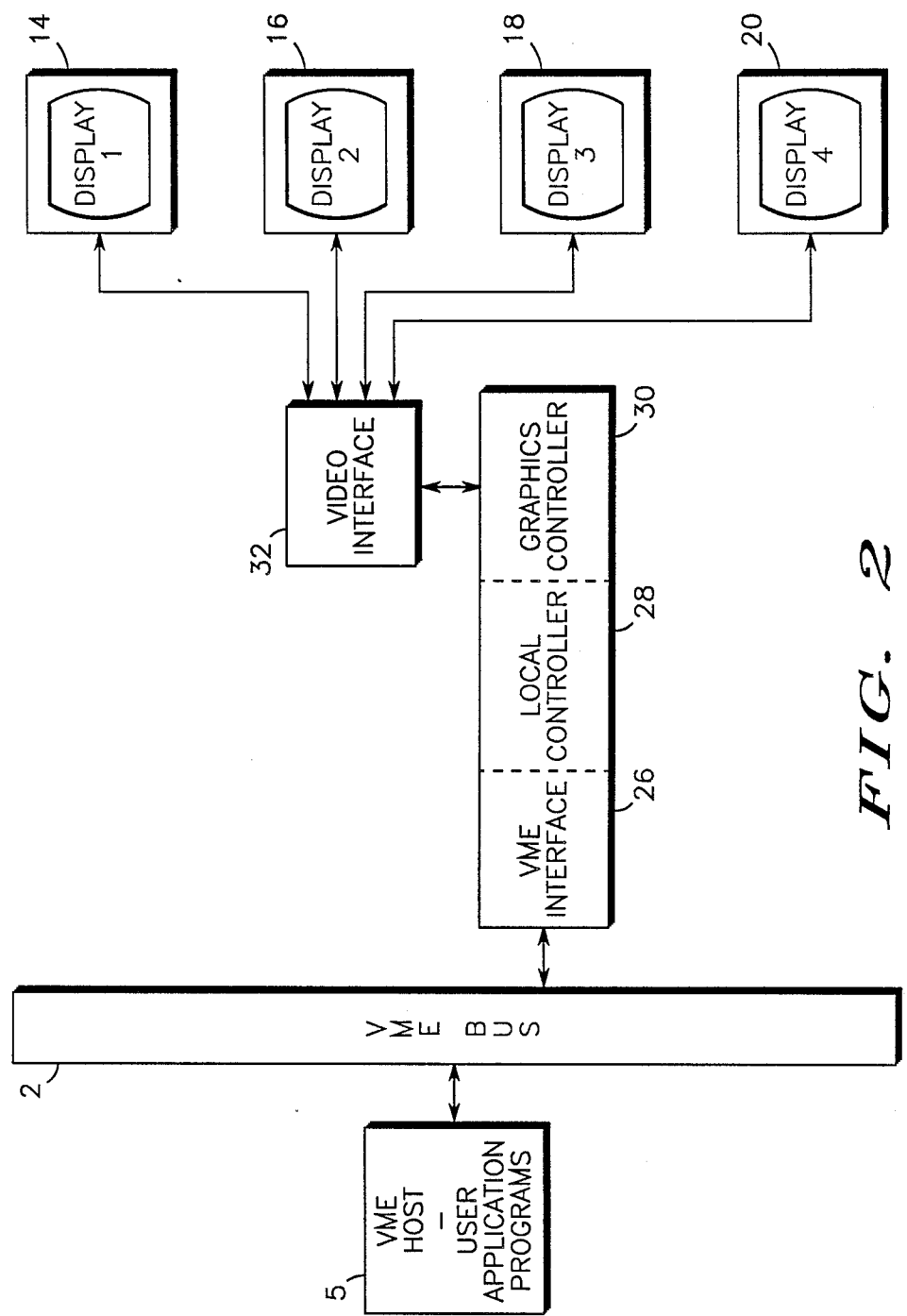
FIG. 2 is block diagram of a preferred embodiment of the present invention.
Figure 4:
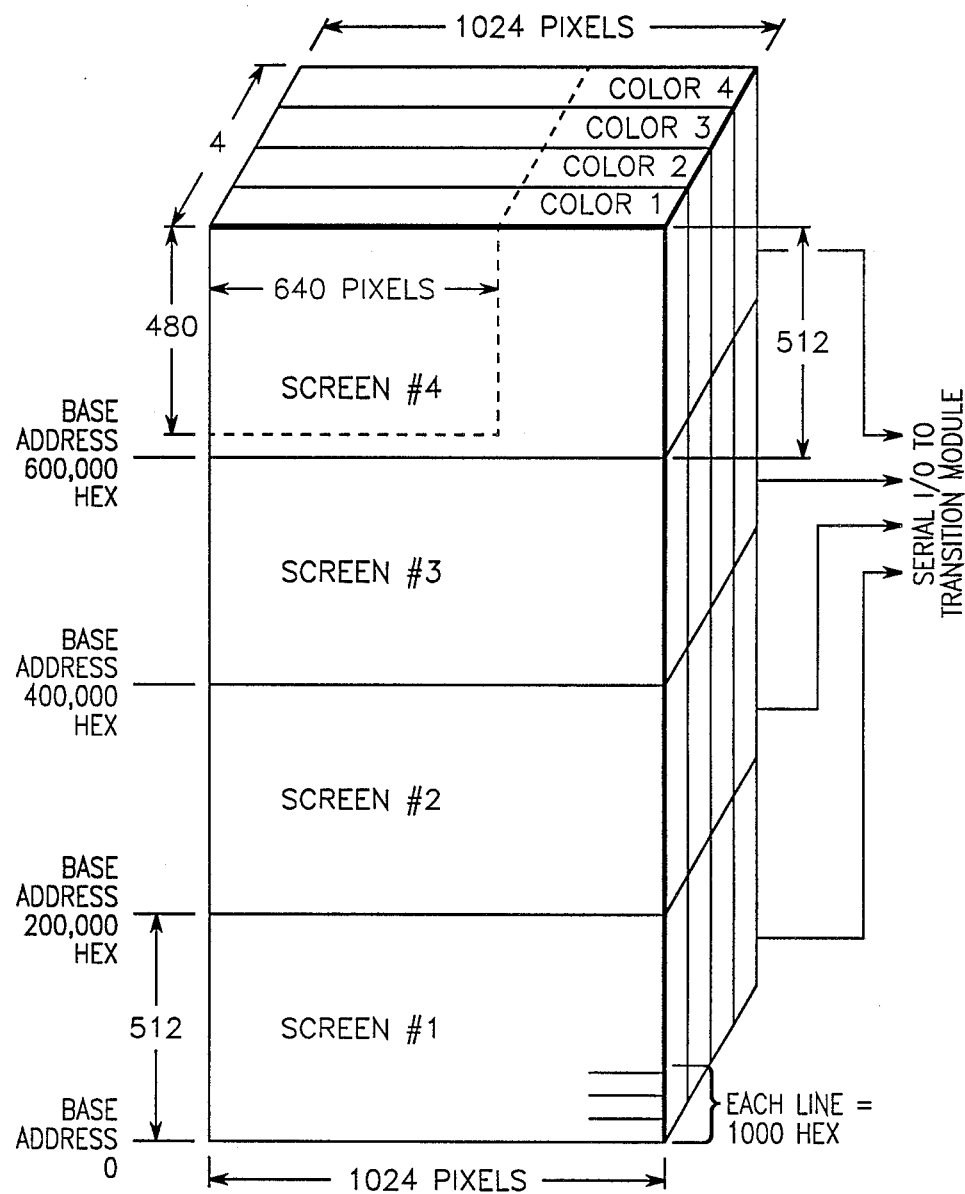
FIG. 4 is a diagram illustrating the allocation of the display RAM in order to provide separate graphics information to four separate terminals.

FIG. 2 illustrates a simplified block diagram of the present invention wherein various application programs 5 are coupled to VME bus 2. VME interface 26 is coupled to local controller 28 and VME bus 2. Local controller 28 is coupled to graphics controller 30 which is in turn coupled to video interface 32. Video interface 32 is then coupled to each of display terminals 14, 16, 18 and 20. In operation VME interface section 26 accesses VME bus 2 in order to receive display information from the various application programs over VME bus 2. This display information is then sent to local controller 28 which acts as a master over graphics controller 30. The display memory portion of graphics controller 30, illustrated further in FIG. 4, is apportioned and multiplexed in order to provide independent sets of video display information to video interface circuit 32. This apportioned and multiplexed video graphics information from controller 30 is then divided by video interface circuit 32, and the appropriate portion is sent to each of display terminals 14, 16, 18 and 20.

Figure 3:
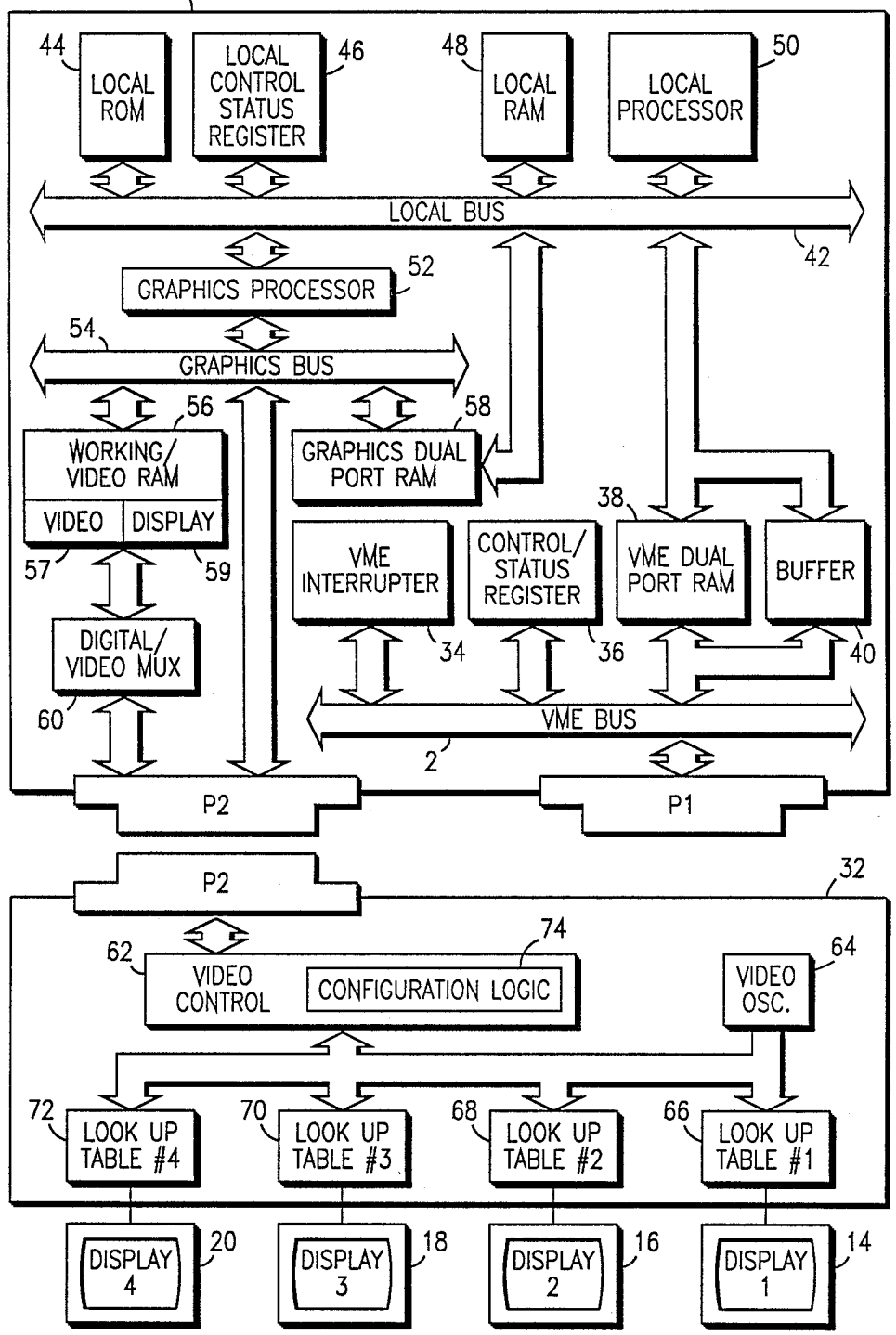
FIG. 3 is a more detailed block diagram of a specific implementation of the present invention illustrating in more detail the interconnection and distribution of the various system elements.

FIG. 3 is a more detailed block diagram illustration of the system of the present invention. The VME interface, illustrated as block 26 in FIG. 2, comprises VME interrupter 34, VME control/status register 36, VME dual port RAM 38 and VME dual port RAM buffer 40. The local controller, illustrated as block 28 in FIG. 2, comprises local processor 50, local ROM 44, local RAM 48, local control/status register 46, and graphics dual port RAM 58. The graphics controller, illustrated as block 30 in FIG. 2, includes graphics processor 52, graphics dual port RAM 58, working/video RAM 56, and digital/video multiplexer 60. The video interface circuit, illustrated as block 32 in FIG. 2, comprises video control section 62, video oscillator 64 and appropriate look-up tables 66, 68, 70 and 72 for each of the displays to be driven.

In operation packets of graphics commands and data are passed from the host to the graphics display system and queued in dual port RAM 38. The queue addresses are segmented such that the host applications write instruction to individual queues, each representing a separate user display. VME dual port RAM buffer 40 can also be configured in a pass-through mode which enables direct connection of local bus 42 with VME bus 2. The system interface is an A32/D16 slave-only interface as described in the VME bus specification (revision C.1). VME interrupter 34 generates interrupts on any of seven VME bus interrupt levels and supplies a 16-bit vector (located in the upper words of VME dual-port memory 38) when a VME interrupt handler responds with a valid interrupt acknowledge cycle. VME control status register 36 is accessible only through VME short R/O address space (address modifiers $29 and $2D).

The local controller utilizes a Motorola MC68010 microprocessor as local processor 50 to perform power-up diagnostic tests, control data communications at the system interface level, manipulate character and graphic information, and run user-specific applications when appropriate. The local controller acts as master over the graphics controller and also performs much of the frontend activity necessary to execute commands from the VME master. Local processor 50 extracts high level commands from VME dual port RAM 38, breaks these commands into lower level primitives, and passes them to graphics processor 52 through either the graphics processor's host port or the graphics dual port RAM 58. In addition, local processor 50 may be permitted to run certain applications directly, such as graph or chartpoint calculations, window management, etc. Local control status register 46 is a 16-bit read/write register available on local bus 42.

Graphics processor 52 is a Texas Instruments TMS 34010 Graphics System Processor (GSP). This is a general purpose microprocessor with field management capability that has been tailored for graphics system design. The GSP is a high performance CMOS 32-bit microprocessor with an instruction set designed for raster graphics applications and containing screen control logic, DRAM and VRAM control logic, host interface logic, bit level arithmetic, and logic operations. Graphics modes allow x and y addressing for ease of software coding. The GSP controls both video and display DRAM refresh cycles as well as all display functions. Working/video RAM 56 comprises a video RAM portion 57 and a display RAM portion 59. Video RAM portion 57 of working/video RAM 56 contains data actually displayed on the screens whereas display RAM portion 59 of working/video RAM 56 contains graphics processor application code, functions, and font libraries, as well as undisplayed window and/or screen information.

The video memory is constructed of dual port video DRAMS. These devices have a parallel interface similar to normal DRAMS on one side and a serial shift register output port on the other side. The two ports operate completely independently except during a shift register load cycle. This allows video data to be shifted out the serial port to refresh the screens while the graphics processor is drawing new information into the parallel port, reducing the screen refresh activities to only 1 percent of total memory bandwidth as opposed to the 50% necessary for other DRAMS.

The graphics display system is configured for a given resolution and number of terminals utilizing configuration logic register 74 located on video interface board 32. Video RAM portion 57 of working/video ram 56 is divided into appropriate sections and mapped as shown in FIG. 4 in response to a configuration logic signal from configuration logic register 74 for a four-channel system as required for video interface board 32. As shown in FIG. 4, the video display portion of the memory is mapped to provide independent video graphics information to each of the four independent displays. Shift register output (digital video) from the display RAM portion of working/video RAM 56 is multiplexed and sent out the P2 connector to video interface module 32. In addition, digital video, horizontal, vertical, and blanking I/O signals, as well as an 8-grid address/data bus and read/write control signals are transferred from digital video multiplexer 60 to video control circuit 62 via connector P2.

The graphics controller system illustrated provides four independent channels with a resolution of 1024×512. Other possible combinations would be a two-channel system with a maximum resolution of 1024×768 or an 8-channel system with a resolution of 1024×256. While the total amount of graphics control is limited by the capacity of the graphics processor, other combinations are possible using various combinations of resolution and number of terminals to be driven. As can be seen, the only physical changes necessary involve video interface board 32, while the VME interface, local controller and graphics controller sections remain virtually identical. This allows a given system to be custom tailored to a customer's specific requirements for a particular number of terminals and required resolution utilizing only a specifically designed video interface card 32, thereby greatly reducing the initial costs for a custom tailored system. In addition there is now required only a single graphics controller in order to drive multiple independent displays which each previously required a separate independent graphics controller.

In addition to providing multiple independent display drivers, video interface card 32 can be used to provide various features required by a given customer such as a mouse input, keyboard I/O, or video camera input without requiring any redesign of the basic VME interface, local controller and graphics controller circuits.

What has been provided therefore is an improved multi-channel graphics control system wherein multiple displays and multiple input output devices may be controlled utilizing a single graphics controller and associated graphics processor. Moreover, specific user systems may be implemented by providing a custom designed circuit board for connection to a standard board wherein the standard board contains a basically unchanged VME interface circuit, local controller and graphics controller.

While there have been described above the principles of the invention and specific configurations in conjunction with specific devices and systems, it is to be clearly understood that this description is made only by way of example and not as a limitation of the scope of the invention.

I claim:

1. A video graphic display system for concurrently providing independent video graphic information to a plurality of video displays comprising:
   bus interface means for receiving from a source, signals which represent independent video graphic information for said plurality of video displays;
   local controller means, coupled to said bus interface means, for generation of separate graphics information from said signals;
   a single graphics controller, coupled to said local controller means, for receiving said separate graphics information and providing separate independent sets of video information; and
   video interface means, coupled to said single graphics controller, for receiving said separate independent sets of video information and concurrently providing video drive signals representing each of said separate independent sets of video information to said plurality of video displays.

2. The video graphic display system of claim 1 wherein said video interface means is located on a separate circuit board from the remainder of said video graphic display system.

3. The video graphic display system of claim 1 wherein said video interface means comprises configuration logic means for configuring said video graphic display system for a predetermined number of display terminals and resolution.

4. The video graphic display system of claim 2 wherein said video interface means further comprises configuration logic means for providing a configuration logic signal to said single graphics controller.

5. The video graphic display system of claim 4 wherein said configuration logic signal comprises a number of said video displays in said plurality of said video displays.

6. The video graphic display system of claim 4 wherein said configuration logic signal comprises a resolution for at least one of said plurality of video displays.

7. A video graphic display system for concurrently providing independent video graphic information to a plurality of video displays comprising:
   bus interface means for receiving from a source, signals which represent independent video graphic information for said plurality of video displays;
   local controller means, coupled to said bus interface means, for generation of separate graphics information from said signals;
   a single graphics controller, coupled to said local controller means, for receiving said separate graphics information and providing separate independent sets of video information;
   video interface means, coupled to said single graphics controller, for receiving said separate independent sets of video information and concurrently providing video drive signals representing each of said separate independent sets of video information to said plurality of video displays; and
   configuration logic means for providing a configuration logic signal to said single graphics controller.

8. The video graphic display system of claim 7 wherein said configuration logic signal comprises a preset number of said plurality of display displays.

9. The video graphic display system of claim 7 wherein said configuration logic signal comprises a resolution of said plurality of display displays.

10. A video graphic display system for concurrently providing independent video graphic information to a plurality of video displays comprising:
    bus interface means for receiving from a source, signals which represent independent video graphic information for said plurality of video displays;
    local controller means, coupled to said bus interface means, for generation of separate graphics information from said signals;
    a single graphics controller, coupled to said local controller means, for receiving said separate graphics information and providing separate independent sets of video information;
    video interface means, coupled to said single graphics controller, for receiving said separate independent sets of video information and concurrently providing video drive signals representing each of said separate independent sets of video information to said plurality of video displays; and
    configuration logic means for providing a video display number and a resolution to said single graphics controller.

* * * * *